US010922616B1

(12) United States Patent
Liu et al.

(10) Patent No.: US 10,922,616 B1
(45) Date of Patent: Feb. 16, 2021

(54) DETERMINING APPAREL SIZES USING PHYSICAL MEASUREMENTS AND ARTIFICIAL INTELLIGENCE

(71) Applicant: Amazon Technologies, Inc., Seattle, WA (US)

(72) Inventors: Chang Liu, Beijing (CN); Chuan Xie, Beijing (CN)

(73) Assignee: Amazon Technologies, Inc., Seattle, WA (US)

(*) Notice: Subject to any disclaimer, the term of this patent is extended or adjusted under 35 U.S.C. 154(b) by 822 days.

(21) Appl. No.: 15/634,152

(22) Filed: Jun. 27, 2017

(51) Int. Cl.
*G06N 20/00* (2019.01)
*G06N 7/00* (2006.01)

(52) U.S. Cl.
CPC ............ *G06N 7/005* (2013.01); *G06N 20/00* (2019.01)

(58) Field of Classification Search
None
See application file for complete search history.

(56) References Cited

U.S. PATENT DOCUMENTS 8,412,656 B1 * 4/2013 Baboo ................ G06Q 30/0282
706/20

OTHER PUBLICATIONS

Wang, et al., Im2Fit: Fast 3D Model Fitting and Anthropometrics using Single Consumer Depth Camera and Synthetic Data, arXiv: 1410.0745, 2014, pp. 1-10 (Year: 2014).*
Clarkson, The Use of Consumer Depth Cameras for Calculating Body Segment Parameters, Doctoral Thesis, Sheffield Hallam University, 2015, pp. 1-255 (Year: 2015).*

* cited by examiner

*Primary Examiner* — Wilbert L Starks
(74) *Attorney, Agent, or Firm* — Eversheds Sutherland (US) LLP

(57) ABSTRACT

Systems, methods, and computer-readable media are disclosed for determining recommended sizes of products using a machine learning model. In one embodiment, an example method may include determining, by one or more computer processors coupled to at least one memory, first user information for a first user, the first user information comprising a height and a weight of the first user, identifying a first body model based at least in part on the first user information, the first body model comprising a first algorithm, determining first estimated body measurement data for the first user using the first body model, the first estimated body measurement data comprising one or more physical dimensions of the first user, generating a first size recommendation of a first product for the first user using the first estimated body measurement data and a first size recommendation model, the first size recommendation comprising a first recommended size of the first product for the first user, determining that the first user purchased the first recommended size of the first product, and updating the first size recommendation model using the first estimated body measurement data and the first size recommendation.

20 Claims, 6 Drawing Sheets

DETERMINING APPAREL SIZES USING PHYSICAL MEASUREMENTS AND ARTIFICIAL INTELLIGENCE

BACKGROUND

Electronic devices may be used to browse and purchase products offered for sale at a webpage or in an application. For certain products, such as clothing products, users may need to determine an appropriate size of the product which will provide a desired fit. Although many brands and manufacturers may use similar size identifiers for clothing products, significant variations in the actual dimensions of similarly identified products may exist. Accordingly, unless a user has previous experience wearing or trying on clothing products of a particular brand or manufacturer, the user may have difficulty selecting appropriate sizes of such products. Further challenges may exist when a user desires to purchase clothing products of a foreign brand and the user is unfamiliar with the size identifiers or size ranges used by the brand. As a result, the user may purchase an inappropriate size or may forego the purchase altogether. Determining recommended sizes of clothing products for a particular user may result in improved user experience in purchasing clothing products offered for sale at a webpage or in an application as well as enhanced confidence in making such purchases.

Figure 1A:
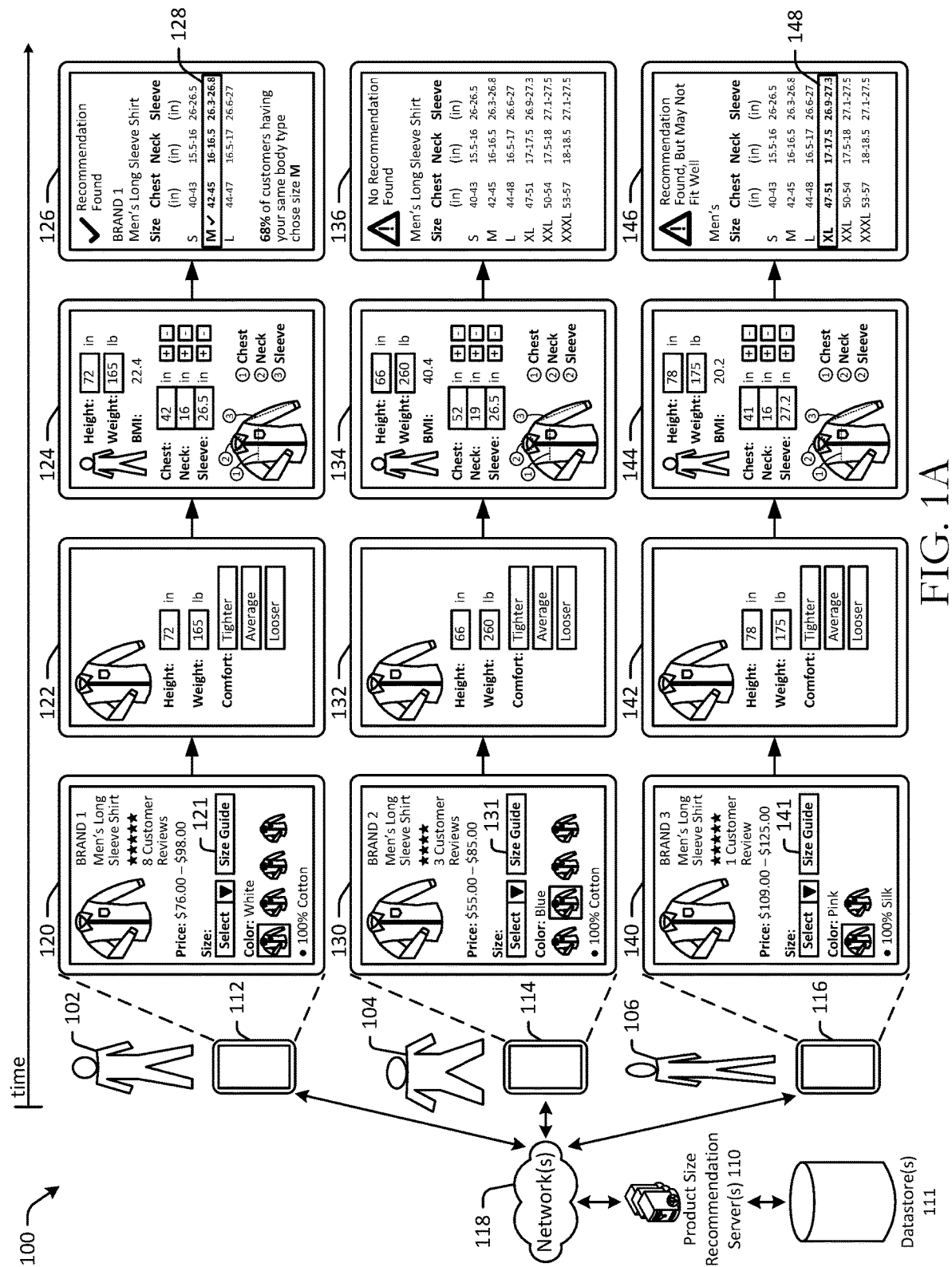
FIG. 1A is a hybrid system and user interface diagram illustrating determining recommended sizes of products using a machine learning model in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may be presented at electronic devices, such that users of the electronic devices may consume or interact with the digital content. Content for delivery may include content such as text, images, videos, audio, and other content. Some content may include images of particular products as well as additional product related information. For example, certain content presented at a webpage or in an application may include images of a particular product offered for sale along with information related to the product offering, such as available sizes, colors, materials, or other product attributes. The product related information provided may guide user decisions in purchasing such products and making selections among the available attributes.

For certain products, such as softlines products (e.g., clothing, footwear, and other accessory products, etc.), users may need to determine an appropriate size of the product which will provide a desired fit. Certain challenges may arise in making this determination when purchasing softlines products offered for sale at a webpage or in an application. Although many brands and manufacturers may use similar size identifiers for softlines products, significant variations in the actual dimensions of similarly identified products may exist. As a result, unless a user has previous experience wearing or trying on softlines products of a particular brand or manufacturer, the user may have difficulty selecting appropriate sizes of such products in order to obtain a desired fit. In some instances, product related information provided at a webpage or in an application may include a size chart to assist users in selecting an appropriate size of the corresponding product. However, size charts often may be generic to a particular department (e.g., men's clothing or women's clothing, etc.) and may not aid a user in understanding size identifiers and size ranges for softlines products of particular brands or manufacturers. Other size charts may be specific to a particular product type (e.g., men's dress shirts or women's blouses, etc.) but still may not provide brand-specific or manufacturer-specific size information. Still other size charts may be specific to a brand or manufacturer but may be generic with respect to product type. Accordingly, size charts generally may be of limited assistance to users in various situations. Further challenges may exist when a user desires to purchase softlines products of a foreign brand and the user is unfamiliar with the size identifiers or size ranges used by the brand. As a result of these and other challenges in size selection of softlines products offered for sale at a webpage or in an application, users may purchase inappropriate sizes or may forego the intended purchases altogether, which may negatively impact user experience and increase user frustration.

Embodiments of the disclosure may minimize inappropriate size selection of softlines products offered for sale at a webpage or in an application, thereby improving user experience in purchasing such products and enhancing user confidence in making such purchases. Certain embodiments may determine recommended sizes of softlines products for a particular user based at least in part on user information associated with the user and historical data relating to past purchases of the same or similar products by other users. Some embodiments may determine first user information for a first user. For example, the first user information may include a height and a weight of the first user, which may be provided by the first user immediately prior to selecting a size of a product to be purchased or may be provided by the first user at an earlier time and stored as part of a user profile. Certain embodiments may identify a first body model based at least in part on the first user information. For example, the height and weight of the first user may be used to determine a first body mass index of the first user. Some embodiments may determine first estimated body measurement data for the first user using the first body model. For example, the first body model may include a first algorithm that may be used to determine the first estimated body measurement data, which may include one or more physical dimensions of the first user, such as a chest dimension, a neck dimension, an arm dimension, a waist dimension, a hip dimension, a leg dimension, or other dimensions of the first user. Certain embodiments may generate a first size recommendation of a first product for the first user using the first estimated body measurement data and a first size recommendation model. For example, the first size recommendation may include a first recommended size of the first product for the first user. The first size recommendation model may be a machine learning model that may be continuously or periodically updated using respective estimated body measurement data and size recommendations associated with additional purchases by the first user or other users. Some embodiments may determine that the first user purchased the first recommended size of the first product and may update the first size recommendation model using the first estimated body measurement data and the first size recommendation. For example, it may be determined that the first user purchased the first recommended size of the first product and did not return the first recommended size of the first product within a predetermined period of time, and then the first size recommendation model may be updated using the first estimated body measurement data and the first size recommendation. The process of determining recommended sizes of softlines products for particular users may be carried out for a large number of users, and thus the size recommendation models may be continuously or periodically trained to improve the size recommendations provided thereby.

As a result, embodiments of the disclosure may assist particular users in minimizing inappropriate size selection of softlines products offered for sale at a webpage or in an application. By using user information associated with a particular user and historical data relating to past purchases of the same or similar products by other users, recommended sizes of softlines products for the particular user may be reliably determined. In this manner, embodiments of the disclosure may minimize poor user experiences associated with improper size selection and may provide users with improved confidence in purchasing softlines products offered for sale at a webpage or in an application.

This disclosure relates to, among other things, systems, methods, computer-readable media, techniques, and methodologies for determining recommended sizes of products using artificial intelligence, which may include one or more machine learning models, predictive algorithms, and the like. Embodiments may determine user information for a particular user, which may include a height and a weight of the user and may identify a body model based at least in part on the first user information. The body model may include an algorithm and may be used to determine estimated body measurement data for the user, which may include one or more physical dimensions of the first user. Embodiments may generate a size recommendation of a particular product for the user using the estimated body measurement data and a size recommendation model. The size recommendation model may use one or more machine learning models, and the size recommendation may include a recommended size of the product for the user. Embodiments may determine that the user purchased the recommended size of the product and may update the size recommendation model using the estimated body measurement data for the user and the size recommendation. Numerous size recommendation models may be maintained and updated to provide users with improved size recommendations, thereby assisting users in appropriate size selection of products.

Figure 1B:
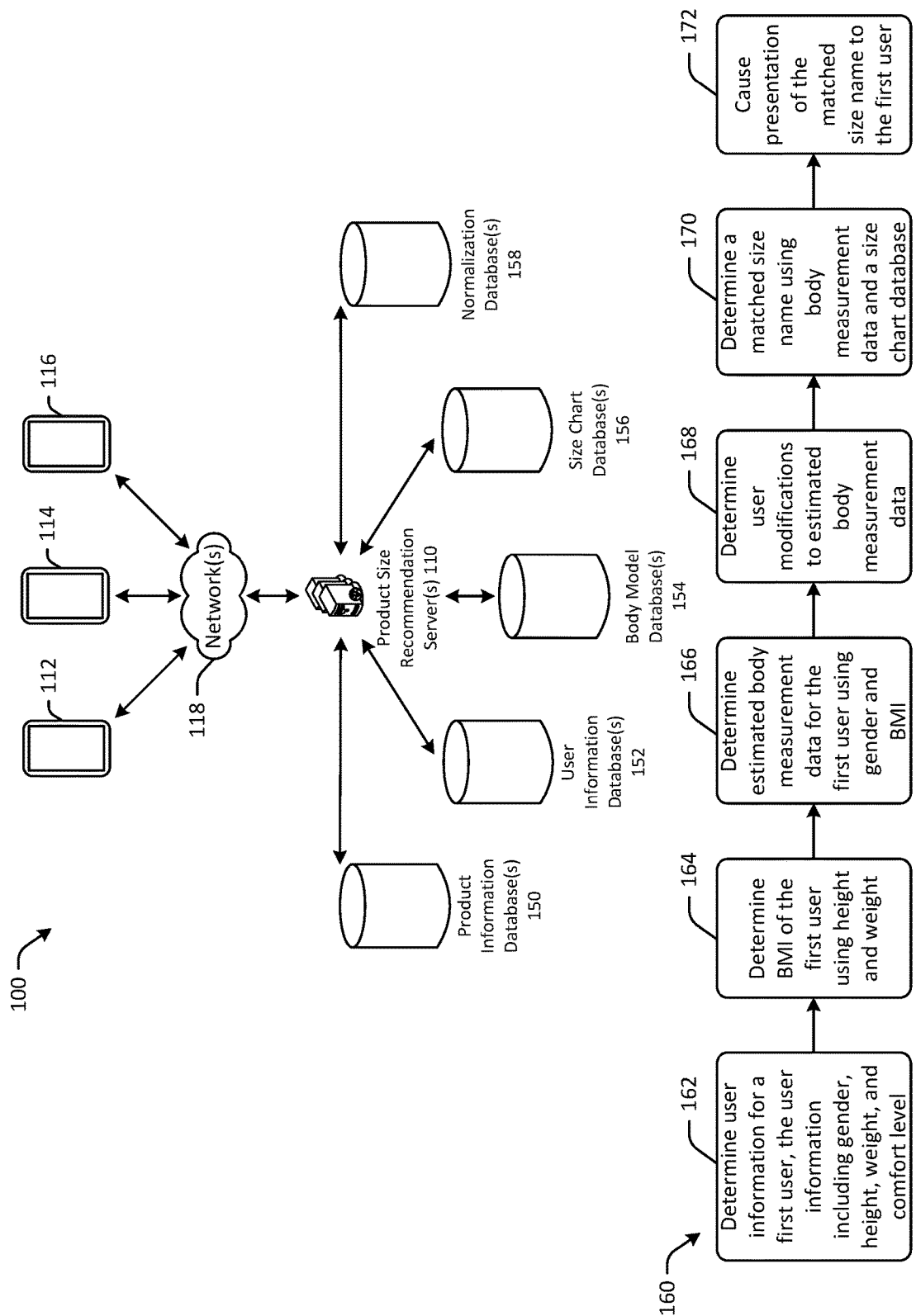
FIG. 1B is a hybrid system and process diagram illustrating determining recommended sizes of products using a machine learning model in accordance with one or more embodiments of the disclosure.

Referring to FIGS. 1A and 1B, an example system 100 illustrating determining recommended sizes of products using a machine learning model in accordance with one or more embodiments of the disclosure is depicted. The system 100 may include one or more servers and at least one or a plurality of user devices that connects to the server. In the example of FIG. 1, one or more product size recommendation servers 110 may be in communication with one or more user devices. Communication between the product size recommendation server 110 and the one or more user devices may be facilitated by one or more networks. The one or more user devices may connect to or communicate with the product size recommendation server 110, on a regular or irregular basis, to receive content, content delivery settings, and/or product size recommendations from the product size recommendation server 110. The one or more user devices may be any type of electronic device used by a user to communicate with the product size recommendation server 110 and receive content, content delivery settings, and/or product size recommendations from the product size recommendation server 110.

In the example of FIGS. 1A and 1B, the product size recommendation server 110 may be in communication with a first user device 112 associated with a first user 102, a second user device 114 associated with a second user 104, and a third user device 116 associated with a third user 106. Communication between the product size recommendation server 110 and the user devices 112, 114, 116 may be facilitated by one or more network(s) 118. The product size recommendation server 110 may be in communication with and deliver content, such as product size recommendations, to any number of user devices. The product size recommendation server 110 may use a machine learning model to determine recommended sizes of products offered for sale at a webpage or in an application, for the users 102, 104, 106 as well as other users in communication with the product size recommendation server 110 by user devices. The product size recommendation server 110 may be in communication with one or more datastore(s) 111 which may store product information, user information, one or more models, and other information accessible to the product size recommendation server 110.

In FIG. 1A, the first user device 112 may connect to the one or more networks 118 and receive digital content for presentation at a first user interface 120. The digital content may be any suitable content, such as text, images, videos, audio, and other content. In some instances, the content may include multiple pieces of content for presentation at respective content delivery slots at a webpage or in an application. The digital content may include images of one or more products offered for sale as well as additional product related information. In some instances, the product may be a softlines product, such as a clothing product, a footwear product, or an accessory product. In the example of FIG. 1A, the product may be a men's long sleeve shirt, and digital content may include one or more images of the shirt. The product related information may include a brand name of the product (e.g., "BRAND 1"), a department of the product (e.g., "Men's"), a product type (e.g., "Long Sleeve Shirt"), a user rating of the product (e.g., a number of stars), a product price or price range (e.g., "$76.00-$98.00"), and/or other information related to the product being offered for sale. The product related information may be stored at the product size recommendation server 110 or at a product information database 150 or other location accessible to the product size recommendation server 110. The digital content also may include one or more selectable elements related to a size offering of the product. The one or more selectable elements may include a first selectable element or other user input field for allowing a user to view one or more size identifiers or size names corresponding to available sizes of the product. The first selectable element may be a drop-down menu, although other types of selectable elements or user input fields may be used. In some instances, the size identifiers or size names may be letters or letter combinations, such as "S," "M," "L," "XL," "XXL," and "XXXL," corresponding to the available sizes of the shirt. In other instances, the size identifiers or size names may be words, such as "Small," "Medium," "Large," "Extra Large," "Double Extra Large," and "Triple Extra Large," corresponding to the available sizes of the shirt. Still other types of size identifiers or size names may be used. The one or more selectable elements also may include a second selectable element 121 for allowing a user to access a size guide for determining a recommended size of the product for the user. The second selectable element 121 may be a selectable button, although other types of selectable elements may be used. In the example of FIG. 1A, the first user 112 may select the second selectable element 121 to access the size guide for the displayed shirt. Selection of the second selectable element 121 may present a second user interface 122. In some instances, the second user interface 122 may be a pop-up window.

The second user interface 122 may include digital content related to user information for the first user 102. The user information may include a height of the first user 102, a weight of the first user 102, a preferred comfort level of the first user 102, and/or other information related to the first user 102. The digital content may include one or more fields for inputting and/or displaying user information for the first user 102. For example, a first field may be provided for inputting and/or displaying a height of the first user 102, and a second field may be provided for inputting and/or displaying a weight of the first user 102. In some instances, the one or more fields may be automatically populated from a user profile of the first user 102. For example, the first user 102 may have a user profile that is stored at the product size recommendation server 110 or at a user information database 152 or other location accessible to the product size recommendation server 110. In this manner, upon selecting the second selectable element 121, the user profile of the first user 102 may be retrieved and the one or more fields may be automatically populated based at least in part on the stored user information. In other instances, the one or more fields may be blank, for example, if the first user 102 does not have a user profile. The digital content also may include one or more selectable elements for inputting and/or displaying user information for the first user 102. The one or more selectable elements may include a number of mutually-exclusive selectable buttons for inputting and/or displaying a preferred comfort level of the first user 102. For example, three selectable buttons may be provided, corresponding to the comfort levels of "Tighter Fit," "Average Fit," and "Looser Fit," respectively. One of the selectable buttons may be preselected based at least in part on a user profile of the first user 102, or all of the selectable buttons may be unselected. The first user 102 may input the user information corresponding to the one or more fields and/or the one or more selectable buttons, or may modify any automatically populated fields or preselected buttons. Upon inputting, reviewing, and/or modifying the user information at the second user interface 122, the first user may confirm that the user information is correct and proceed to a third user interface 124. The product size recommendation server 110 may receive the user information for the first user 102 and update the user profile of the first user 102 accordingly.

The third user interface 124 may include digital content related to estimated body measurement data for the first user 102. The estimated body measurement data may include one or more physical dimensions of the first user 102. For example, the estimated body measurement data may include a chest dimension, a neck dimension, an arm dimension, a waist dimension, a hip dimension, a leg dimension, a foot dimension, and/or other physical dimensions of the first user 102. In some instances, the estimated body measurement data presented at the third user interface 124 may be limited to estimated body measurement data that is relevant to a size determination with the respect to the displayed product. In the example of FIG. 1A, the estimated body measurement data may include a chest dimension, a neck dimension, and an arm dimension (e.g., sleeve length) of the first user 102, as may be relevant to a size determination with respect to a long sleeve shirt. In another example, the estimated body measurement data may include a foot dimension (e.g., foot length, foot width, etc.) of a user, as may be relevant to a size determination with respect to a shoe or a boot. The estimated body measurement data may be determined by the product size recommendation server 110 based at least in part on the height and the weight of the first user 102. In some instances, the product size recommendation server 110 may determine a body mass index (BMI) of the first user 102. For example, the product size recommendation server 110 may determine the body mass index of the first user 102 based at least in part on the height and the weight of the first user 102. In some instances, the height, the weight, and the body mass index of the first user 102 also may be presented at the third user interface 124. As described below, the product size recommendation server 110 may identify a body model based at least in part on the body mass index of the first user 102 and may determine the estimated body measurement data using the body model. A body model may include one or more machine learning algorithms or models. A number of body models may be stored at the product size recommendation server 110 or at a body model database 154 or other location accessible to the product size recommendation server 110. The estimated body measurement data may be presented at one or more fields at the third user interface 124. In some instances, the estimated body measurement data presented at the one or more fields may be modified by the first user 102. For example, the digital content of the third user interface 124 may include one or more selectable elements, such as selectable buttons, for allowing the first user to incrementally increase or decrease the respective values of the estimated body measurement data. In this manner, the first user 102 may modify one or more the values of the estimated body measurement data, as desired. For example, the first user 102 may a shirt with a neck dimension that is smaller or larger than the neck dimension determined by the product size recommendation server 110 and may modify the value accordingly. Upon reviewing and/or modifying the estimated body measurement data at the third user interface 124, the first user 102 may proceed to a fourth user interface 126. The product size recommendation server 110 may identify the estimated body measurement data and/or the modified body measurement data for the first user 102.

The fourth user interface 126 may include digital content related to a size recommendation of the product for the first user 102. The size recommendation may include one or more recommended sizes of the product for the first user 102. In some instances, as in the example of FIG. 1A, the digital content may include an indication that a recommended size was determined by the product size recommendation server 110. The product size recommendation server 110 may generate the size recommendation, and determine the recommended size, using the estimated body measurement data and/or the modified body measurement data, a size recommendation model, and a size chart, as further described below. The size recommendation model may be one of multiple size recommendation models used by the product size recommendation server 110 and may be selected based at least in part on the user information and/or the estimated body measurement data and/or the modified body measurement data for the first user 102. A number of size recommendation models may be stored at the product size recommendation server 110 or at a separate database or other location accessible to the product size recommendation server 110. A size recommendation model may include one or more machine learning algorithms or models. The size chart may include size names for the available sizes of the product and corresponding ranges of the physical dimensions relevant to the product. A number of size charts may be stored at the product size recommendation server 110 or at a size chart database 156 or other location accessible to the product size recommendation server 110. In some instances, the size chart used by the product size recommendation server 110 may be specific to a particular brand, a particular department, and a particular product. For example, the size chart used by the product size recommendation server 110 may be specific to the brand "BRAND 1," the department "Men's", and the product "Long Sleeve Shirt." In other instances, the size chart used by the product size recommendation server 110 may be specific to a particular a particular department and a particular product but generic with respect to brand. In still other instances, the size chart used by the product size recommendation server 110 may be specific to a particular a particular department but generic with respect to product type and brand.

The size recommendation provided at the fourth user interface 126 may include a portion of the size chart or the entire size chart used by the product size recommendation server 110. The recommended size may be indicated by one or more features, such that the recommended size may be distinguished from any other sizes provided at the fourth user interface 126. In the example of FIG. 1A, a portion of the size chart may be provided, including a recommended size 128, a next-smallest size, and a next-largest size of the product. The recommended size 128 may be indicated by bold text of the corresponding size name and dimension ranges, a border surrounding the corresponding size name and dimension ranges, and/or a symbol, such as a check mark, adjacent the corresponding size name.

In some instances, the size name of the recommended size in the size chart used by the product size recommendation server 110 may be equal to or identical to one of the size names of the source marketplace (e.g., one of the size names provided at the first selectable element at the first user interface 120). In other words, the size name of the recommended size in the size chart may be present in the size listing of the source marketplace. In such instances, the size name of the recommended size may be presented at the fourth user interface 126 in the same manner as in the size chart, such that the first user 102 may easily identify and select the appropriate size name using the first selectable element at the first user interface 120. In other instances, the size name of the recommended size in the size chart used by the product size recommendation server 110 may be different than the size names provided by the first selectable element at the first user interface 120. In other words, the size name of the recommended size in the size chart may not be present in the size listing of the source marketplace. For example, the size name of the recommended size in the size chart may be "M," and the size names provided by the first selectable element at the first user interface 120 may be "Small," "Medium," "Large," "Extra Large," "Double Extra Large," and "Triple Extra Large." In such instances, the product size recommendation server 110 may normalize, or at least attempt to normalize, the recommended size in the size chart. In other words, the product size recommendation server 110 may convert, or at least attempt to convert, the recommended size in the size chart such that the recommended size 128 presented at the fourth user interface 126 is equal to or identical to one of the size names provided by the first selectable element at the first user interface 120. In this manner, normalization of the recommended size may avoid user confusion. A number of mapping tables may be stored at the product size recommendation server 110 or at a normalization database 158 or other location accessible to the product size recommendation server 110 for use in normalizing the size name of the recommended size in the size chart, when necessary.

In some instances, the fourth user interface 126 may include a confidence indication, such as a confidence value represented numerically in one example, associated with the size recommendation of the product for the first user 102. For example, the confidence indication may include a value associated with past users having estimated body measurement data corresponding to the estimated body measurement data for the first user 102 and who purchased the recommended size of the product and did not return the recommended size of the product within a predetermined time period. In this manner, the confidence indication may provide the first user 102 with enhanced confidence in selecting the recommended size 128. The value of the confidence indication may be expressed as a percentage or as an aggregate number.

Upon reviewing the size recommendation at the fourth user interface 126, the first user 102 may exit the size guide and return to the first user interface 120. The first user 102 may identify and select the appropriate size listed in the first selectable element at the first user interface 120 and purchase the recommended size of the product. In some instances, data relating to the purchase of the recommended size of the product may be stored as a part of the user profile of the first user 102 and/or elsewhere at a location accessible to the product size recommendation server 110. After the purchase, the product size recommendation server 110 may update the corresponding size recommendation model using the estimated body measurement data of the first user 102 and the size recommendation. In some instances, the size recommendation model may be updated using the estimated body measurement data of the first user 102 and the size recommendation after a predetermined period of time has passed and the first user 102 has not returned the recommended size of the product.

In a similar manner, the second user device 114 may connect to the one or more networks 118 and receive digital content for presentation at a first user interface 130. The first user interface 130 may be similar to the first user interface 120, but the content presented at the first user interface 130 may be related to a different product. In particular, the content presented at the first user interface 130 may be related to a different men's long sleeve shirt of a different brand. The digital content similarly may include one or more selectable elements related to a size offering of the product, such as a first selectable element for allowing the second user 104 to view one or more size identifiers or size names corresponding to available sizes of the product, and a second selectable element 131 for allowing the second user 104 to access a size guide for determining a recommended size of the product for the second user 104. A second user interface 132 may include digital content related to user information for the second user 104, which information may be input, reviewed, and/or modified by the second user 104. A third user interface 134 may include digital content related to estimated body measurement data for the second user 104, which data may be reviewed, accepted, and/or modified by the second user 104 to proceed to a fourth user interface 136.

The fourth user interface 136 may include digital content related to a size recommendation of the product for the second user 104. In some instances, as in the example of FIG. 1A, the digital content may include an indication that no size recommendation was determined by the product size recommendation server 110. As a result, the product size recommendation server 110 may cause a notification to be presented at the fourth user interface 136, indicating that no size recommendation was determined. In some instances, the product size recommendation server 110 also may cause an entire size chart corresponding to the product to be presented at the fourth user interface 136, such that the second user 104 may review size chart and determine whether one of the available sizes may be suitable. The size chart may include size names for the available sizes of the product and corresponding ranges of the physical dimensions relevant to the product. In the example of FIG. 1A, the size chart used by the product size recommendation server 110 and presented at the fourth user interface 136 may be specific a particular department (e.g., "Men's") and a particular product type (e.g., "Long Sleeve Shirt") but generic with respect to brand.

Upon reviewing the information provided at the fourth user interface 136, the second user 104 may exit the size guide and return to the first user interface 130. The second user 104 may select a desired size listed in the first selectable element at the first user interface 130 and purchase the recommended size of the product. In some instances, data relating to the purchase of the recommended size of the product may be stored as a part of the user profile of the second user 104 and/or elsewhere at a location accessible to the product size recommendation server 110. After the purchase, the product size recommendation server 110 may update the corresponding size recommendation model using the estimated body measurement data of the second user 104 and the purchased size. In some instances, the size recommendation model may be updated using the estimated body measurement data of the second user 104 and the purchased size after a predetermined period of time has passed and the second user 104 has not returned the purchased size of the product.

The third user device 116 likewise may connect to the one or more networks 118 and receive digital content for presentation at a first user interface 140. The first user interface 140 may be similar to the first user interface 120 and the first user interface 130, but the content presented at the first user interface 140 may be related to a different product. In particular, the content presented at the first user interface 150 may be related to a different men's long sleeve shirt of a different brand. The digital content similarly may include one or more selectable elements related to a size offering of the product, such as a first selectable element for allowing the third user 106 to view one or more size identifiers or size names corresponding to available sizes of the product, and a second selectable element 141 for allowing the third user 106 to access a size guide for determining a recommended size of the product for the third user 106. A second user interface 142 may include digital content related to user information for the third user 106, which information may be input, reviewed, and/or modified by the third user 106. A third user interface 144 may include digital content related to estimated body measurement data for the third user 106, which data may be reviewed, accepted, and/or modified by the third user 106 to proceed to a fourth user interface 146.

The fourth user interface 146 may include digital content related to a size recommendation of the product for the third user 106. In some instances, as in the example of FIG. 1A, the digital content may include an indication that a size recommendation was determined by the product size recommendation server 110 but that the recommended size may not fit well. As a result, the product size recommendation server 110 may cause a notification to be presented at the fourth user interface 146, indicating that a size recommendation was determined for the third user 106 but that the recommended size may not fit well. The product size recommendation server 110 may generate the size recommendation, and determine the recommended size, using the estimated body measurement data and/or the modified body measurement data, a size recommendation model, and a size chart. The size recommendation model may be one of multiple size recommendation models used by the product size recommendation server 110 and may be selected based at least in part on the user information and/or the estimated body measurement data and/or the modified body measurement data for the third user 106. The size chart may include size names for the available sizes of the product and corresponding ranges of the physical dimensions relevant to the product. In the example of FIG. 1A, the size chart used by the product size recommendation server 110 and presented at the fourth user interface 146 may be specific to a particular department (e.g., "Men's") but generic with respect to product type and brand. In some instances, the product size recommendation server 110 may cause the entire size chart corresponding to the product to be presented at the fourth user interface 146, such that the third user 106 may review size chart and determine whether another one of the available sizes may be suitable. A recommended size 148 may be indicated by one or more features, such that the recommended size may be distinguished from the other sizes provided at the fourth user interface 146. In the example of FIG. 1A, the recommended size 148 may be indicated by bold text of the corresponding size name and dimension ranges, and a border surrounding the corresponding size name and dimension ranges.

Upon reviewing the size recommendation at the fourth user interface 146, the third user 106 may exit the size guide and return to the first user interface 140. The third user 106 may identify and select the appropriate size listed in the first selectable element at the first user interface 140 and purchase the recommended size or a different size of the product. In some instances, data relating to the purchase of the recommended size or a different size of the product may be stored as a part of the user profile of the third user 106 and/or elsewhere at a location accessible to the product size recommendation server 110. After the purchase, the product size recommendation server 110 may update the corresponding size recommendation model using the estimated body measurement data of the third user 106 and the size recommendation. In some instances, the size recommendation model may be updated using the estimated body measurement data of the third user 106 and the size recommendation or another purchased size after a predetermined period of time has passed and the third user 106 has not returned the recommended size or the other purchased size of the product.

To determine an appropriate size recommendation of a product for a user, such as the first user 102, the second user 104, or the third user 106, the product size recommendation server 110 may execute one or more process flows. For example, an example process flow 160 for determining an appropriate size recommendation of a product for a user is depicted in FIG. 1B.

At block 162 of the process flow 160, the product size recommendation server 110 may determine user information for a first user. The user information may include a height of the first user, a weight of the first user, a preferred comfort level of the first user, and/or other information related to the first user. In some instances, a portion or all of the user information may be input by the first user interacting with a user interface presented at a user device, and the product size recommendation server 110 may determine the user information input by the first user. In some instances, a portion or all of the user information may be based at least in part on information stored in a user profile of the first user, and the product size recommendation server 110 may retrieve or otherwise determine the user information. In some instances, a portion or all of the user information may manually modified by the first user, and the product size recommendation server 110 may determine the modified user information.

At block 164 of the process flow 160, the product size recommendation server 110 may determine a body mass index of the first user. In some instances, the product size recommendation server 110 may determine the body mass index of the first user based at least in part on the height and the weight of the first user.

At block 166 of the process flow 160, the product size recommendation server 110 may determine estimated body measurement data for the first user. The estimated body measurement data may include one or more physical dimensions of the first user. For example, the estimated body measurement data may include a chest dimension, a neck dimension, an arm dimension, a waist dimension, a hip dimension, a leg dimension, and/or other physical dimensions of the first user. In some instances, the product size recommendation server 110 may determine only estimated body measurement data that is relevant to a size determination with the respect to a particular product being considered by the first user. The product size recommendation server 110 may determine the estimated body measurement data based at least in part on the height and the weight of the first user. In some instances, the product size recommendation server 110 may determine the estimated body measurement data based at least in part on the body mass index of the first user. The product size recommendation server 110 may identify a body model based at least in part on the body mass index of the first user and may determine the estimated body measurement data using the body model. The body model may include one or more algorithms for determining the estimated body measurement data.

At block 168 of the process flow 160, the product size recommendation server 110 may determine any user modifications to the estimated body measurement data for the first user. In some instances, the estimated body measurement data may be presented at user interface of a user device, and the first user may have an opportunity to modify the estimated body measurement data, as desired. The product size recommendation server 110 may receive an indication of user modifications to the estimated body measurement data by the first user and determine the modified body measurement data.

At block 170 of the process flow 160, the product size recommendation server 110 may determine a matched size name or recommended size using the estimated body measurement data and/or the modified body measurement data, if any, for the first user and a size chart database. In some instances, the product size recommendation server 110 may initially operate in a cold start mode for a period of time and then transition to a machine learning mode after data has been collected to support use of a machine learning model for determining matched sizes. The matched size name may be an available size of a particular product which accommodates the estimated body measurement data and/or the modified body measurement data, if any, for the first user. When operating in the cold start mode, the product size recommendation server 110 may apply one or more predefined rules to determine a matched size name or recommended size in a size chart corresponding to a particular product. When operating in the machine learning mode, the product size recommendation server 110 may use one of a number of size recommendation models selected based at least in part on the user information and/or the estimated or modified body measurement data for the first user.

At block 172 of the process flow 160, the product size recommendation server 110 may cause a presentation of the matched size name or recommended size to the first user. The product size recommendation server 110 may cause the matched size name or recommended size to be presented to the first user at a user device as a part of a size recommendation. In some instances, the matched size name or recommended size may be normalized to a size name of a source marketplace. In some instances, the product size recommendation server 110 may determine a confidence indication which also may be presented to the first user as a part of the size recommendation. The confidence indication may include a value associated with past users having estimated body measurement data corresponding to the estimated body measurement data for the first user and who purchased the recommended size of the product and did not return the recommended size of the product within a predetermined time period.

By implementing the process of determining user information for a particular user, identifying a body model based at least in part on the user information, determining estimated body measurement data for the user using the body model, generating a size recommendation of a particular product for the user using the estimated body measurement data and a machine-learning size recommendation mode, and updating the size recommendation model using the estimated body measurement data and the size recommendation for user purchases of the recommended size and/or other sizes of the product, embodiments of the disclosure may assist particular users in minimizing inappropriate size selection of products offered for sale at a webpage or in an application.

As a result, embodiments of the disclosure may assist particular users in minimizing inappropriate size selection of softlines products offered for sale at a webpage or in an application. By using user information associated with a particular user and historical data relating to past purchases of the same or similar products by other users, recommended sizes of softlines products for the particular user may be reliably determined. In this manner, embodiments of the disclosure may minimize poor user experiences associated with improper size selection and may provide users with improved confidence in purchasing products offered for sale at a webpage or in an application.

The systems, methods, computer-readable media, techniques, and methodologies for determining recommended sizes of products using a machine learning model may assist particular users in minimizing inappropriate size selection of softlines products offered for sale at a webpage or in an application. By using user information associated with a particular user and historical data relating to past purchases of the same or similar products by other users, recommended sizes of softlines products for the particular user may be reliably determined.

Example embodiments of the disclosure provide a number of technical features or technical effects. For example, in accordance with example embodiments of the disclosure, certain embodiments of the disclosure may determine estimated body measurement data for a particular user using a body model identified based at least in part on user information, such as a height and a weight of a user. As a result, the user need only provide minimal, easily determined information in order to obtain a size recommendation. Embodiments of the disclosure may generate a size recommendation of a product for the user using the estimated body measurement data and a machine-learning size recommendation model and may update the size recommendation model using the estimated body measurement data and the size recommendation for user purchases of the recommended size of the product. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
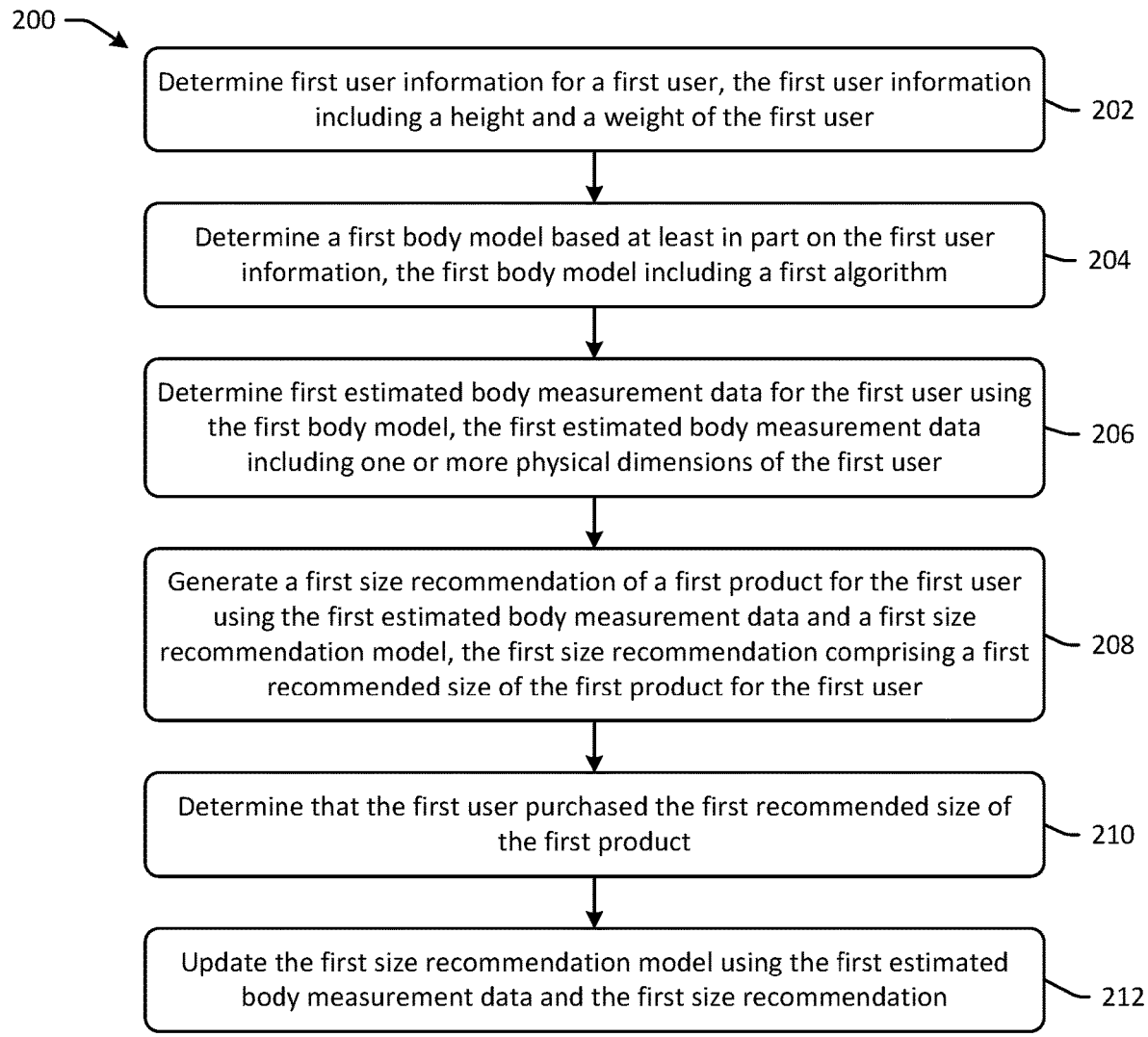
FIG. 2 is an example process flow diagram for determining recommended sizes of products using a machine learning model in accordance with one or more embodiments of the disclosure.

Referring to FIG. 2, an example process flow 200 for determining recommended sizes of products using a machine learning model in accordance with one or more embodiments of the disclosure is depicted. Although certain operations are illustrated as occurring separately in FIG. 2, some or all of the operations may occur concurrently or partially concurrently across one or more computer systems. In some embodiments, the operations of the process flow 200 may be executed by a remote server, such as a product size recommendation server.

At block 202 of the process flow 200, first user information for a first user may be determined, the first user information including a height and a weight of the first user. For example, computer-executable instructions of one or more product size recommendation module(s) stored at a server may be executed to determine first user information for a first user. The first user information may include a height and a weight of the first user. The first user information also may include, in addition to the height and the weight of the first user, a preferred comfort level or fit level of the first user. In some embodiments, a server, such as a product size recommendation server, may determine first user information for a first user.

At block 204 of the process flow 200, a first body model may be identified based at least in part on the first user information, the first body model including a first algorithm. For example, computer-executable instructions of one or more product size recommendation module(s) stored at a server may be executed to identify a first body model based at least in part on the first user information. The first body model may include a first algorithm. The first body model may include, in addition to the first algorithm, a second algorithm or any number of additional algorithms. In some embodiments, a server, such as a product size recommendation server, may identify a first body model based at least in part on the first user information.

At block 206 of the process flow 200, first estimated body measurement data for the first user may be determined using the first body model, the first estimated body measurement data including one or more physical dimensions of the first user. For example, computer-executable instructions of one or more product size recommendation module(s) stored at a server may be executed to determine first estimated body measurement data for the first user using the first body model. The one or more physical dimensions may include at least one of a chest dimension, a neck dimension, an arm dimension, a waist dimension, a hip dimension, a leg dimension, and/or other physical dimensions of the first user. In some embodiments, a server, such as a product size recommendation server, may determine first estimated body measurement data for the first user using the first body model.

At block 208 of the process flow 200, a first size recommendation of a first product for the first user may be generated using the first estimated body measurement data and a first size recommendation model, the first size recommendation including a first recommended size of the first product for the first user. For example, computer-executable instructions of one or more product size recommendation module(s) stored at a server may be executed to generate a first size recommendation of a first product for the first user using the first estimated body measurement data and a first size recommendation model. The first size recommendation model may be a machine learning model. In some embodiments, a server, such as a product size recommendation server, may generate a first size recommendation of a first product for the first user using the first estimated body measurement data and a first size recommendation model.

At block 210 of the process flow 200, it may be determined that the first user purchased the first recommended size of the first product. For example, computer-executable instructions of one or more product size recommendation module(s) stored at a server may be executed to determine that the first user purchased the first recommended size of the first product. In some embodiments, a server, such as a product size recommendation server, may determine that the first user purchased the first recommended size of the first product.

At block 212 of the process flow 200, the first size recommendation model may be updated using the first estimated body measurement data and the first size recommendation. For example, computer-executable instructions of one or more product size recommendation module(s)

stored at a server may be executed to update the first size recommendation model using the first estimated body measurement data and the first size recommendation. In some embodiments, a server, such as a product size recommendation server, may update the first size recommendation model using the first estimated body measurement data and the first size recommendation.

Figure 3:
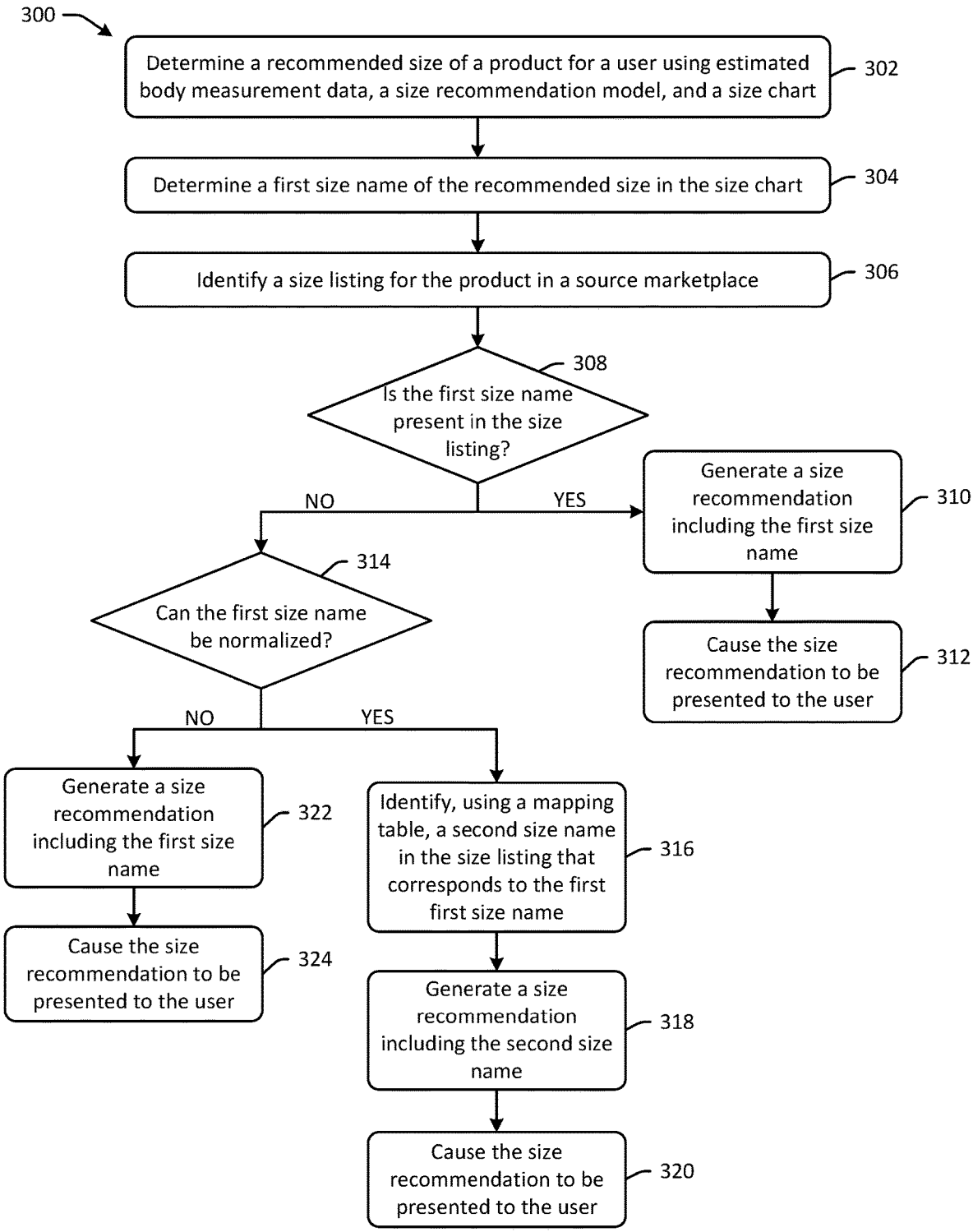
FIG. 3 is an example process flow diagram for generating and presenting a size recommendation with respect to a particular product for a particular user in accordance with one or more embodiments of the disclosure.

FIG. 3 depicts an example process flow 300 for generating and presenting a size recommendation with respect to a particular product for a particular user is depicted. Although certain operations are illustrated as occurring separately in FIG. 3, some or all of the operations may occur concurrently or partially concurrently across one or more computer systems. In some embodiments, the operations of the process flow 300 may be executed by a remote server, such as a product size recommendation server.

At block 302 of the process flow 300, a recommended size of a product for a user may be determined using estimated body measurement data, a size recommendation model, and a size chart. For example, computer-executable instructions of one or more product size recommendation module(s) stored at a server may be executed to determine a recommended size of a product for a user may be determined using estimated body measurement data, a size recommendation model, and a size chart. In some embodiments, a server, such as a product size recommendation server, may determine a recommended size of a product for a user may be determined using estimated body measurement data, a size recommendation model, and a size chart.

At block 304 of the process flow 300, a first size name of the recommended size in the size chart may be determined. For example, computer-executable instructions of one or more product size recommendation module(s) stored at a server may be executed to determine a first size name of the recommended size in the size chart. In some embodiments, a server, such as a product size recommendation server, may determine a first size name of the recommended size in the size chart.

At block 306 of the process flow 300, a size listing for the product in a source marketplace may be determined. For example, computer-executable instructions of one or more product size recommendation module(s) stored at a server may be executed to determine a size listing for the product in a source marketplace. In some embodiments, a server, such as a product size recommendation server, may determine a size listing for the product in a source marketplace.

At determination block 308 of the process flow 300, a determination is made as to whether the first size name is present in the size listing. For example, computer-executable instructions of one or more product size recommendation module(s) stored at a server may be executed to determine whether the first size name is present in the size listing. In some embodiments, a server, such as a product size recommendation server, may determine whether the first size name is present in the size listing. If it is determined that the first size name is present in the size listing, the process flow 300 may proceed to block 310. If it is determined that the first size name is not present in the size listing, the process flow 300 may proceed to determination block 314.

At block 310 of the process flow 300, a size recommendation including the first size name may be generated. For example, computer-executable instructions of one or more product size recommendation module(s) stored at a server may be executed to generate a size recommendation including the first size name. In some embodiments, a server, such as a product size recommendation server, may generate a size recommendation including the first size name.

At block 312 of the process flow 300, the size recommendation may be caused to be presented to the user. For example, computer-executable instructions of one or more product size recommendation module(s) stored at a server may be executed to cause the size recommendation to be presented to the user. In some embodiments, a server, such as a product size recommendation server, may cause the size recommendation to be presented to the user.

At determination block 314 of the process flow 300, a determination is made as to whether the first size name can be normalized. For example, computer-executable instructions of one or more product size recommendation module(s) stored at a server may be executed to determine whether the first size name can be normalized. In some embodiments, a server, such as a product size recommendation server, may determine whether the first size name can be normalized. If it is determined that the first size name can be normalized, the process flow 300 may proceed to block 316. If it is determined that the first size name cannot be normalized, the process flow 300 may proceed to block 322.

At block 316 of the process flow 300, a second size name in the size listing that corresponds to the first size name may be identified using a mapping table. For example, computer-executable instructions of one or more product size recommendation module(s) stored at a server may be executed to identify a second size name in the size listing that corresponds to the first size name using a mapping table. A mapping table may include respective lists of size names in one or more source marketplaces and size names in one or more size charts for a product, with corresponding size names of the respective lists identified for mapping purposes. In this manner, when a size name in a size chart is known, the mapping table may be used to determine a corresponding size name in the source marketplace. In some instances, the mapping table also may include a list of identifiers for different sizes of a product, with each identifier corresponding to one size of the product. The identifiers may be identification numbers or other values, which also may be provided in one or more size charts for the product. In this manner, when a size name in a size chart is known, the respective identifier may be used to determine the corresponding size name in a source marketplace in the mapping table. In some embodiments, a server, such as a product size recommendation server, may identify a second size name in the size listing that corresponds to the first size name using a mapping table.

At block 318 of the process flow 300, a size recommendation including the second size name may be generated. For example, computer-executable instructions of one or more product size recommendation module(s) stored at a server may be executed to generate a size recommendation including the second size name. In some embodiments, a server, such as a product size recommendation server, may generate a size recommendation including the second size name.

At block 320 of the process flow 300, the size recommendation may be caused to be presented to the user. For example, computer-executable instructions of one or more product size recommendation module(s) stored at a server may be executed to cause the size recommendation to be presented to the user. In some embodiments, a server, such as a product size recommendation server, may cause the size recommendation to be presented to the user.

At block 322 of the process flow 300, a size recommendation including the first size name may be generated. For example, computer-executable instructions of one or more product size recommendation module(s) stored at a server may be executed to generate a size recommendation including the first size name. In some embodiments, a server, such as a product size recommendation server, may generate a size recommendation including the first size name.

At block 324 of the process flow 300, the size recommendation may be caused to be presented to the user. For example, computer-executable instructions of one or more product size recommendation module(s) stored at a server may be executed to cause the size recommendation to be presented to the user. In some embodiments, a server, such as a product size recommendation server, may cause the size recommendation to be presented to the user.

Figure 4:
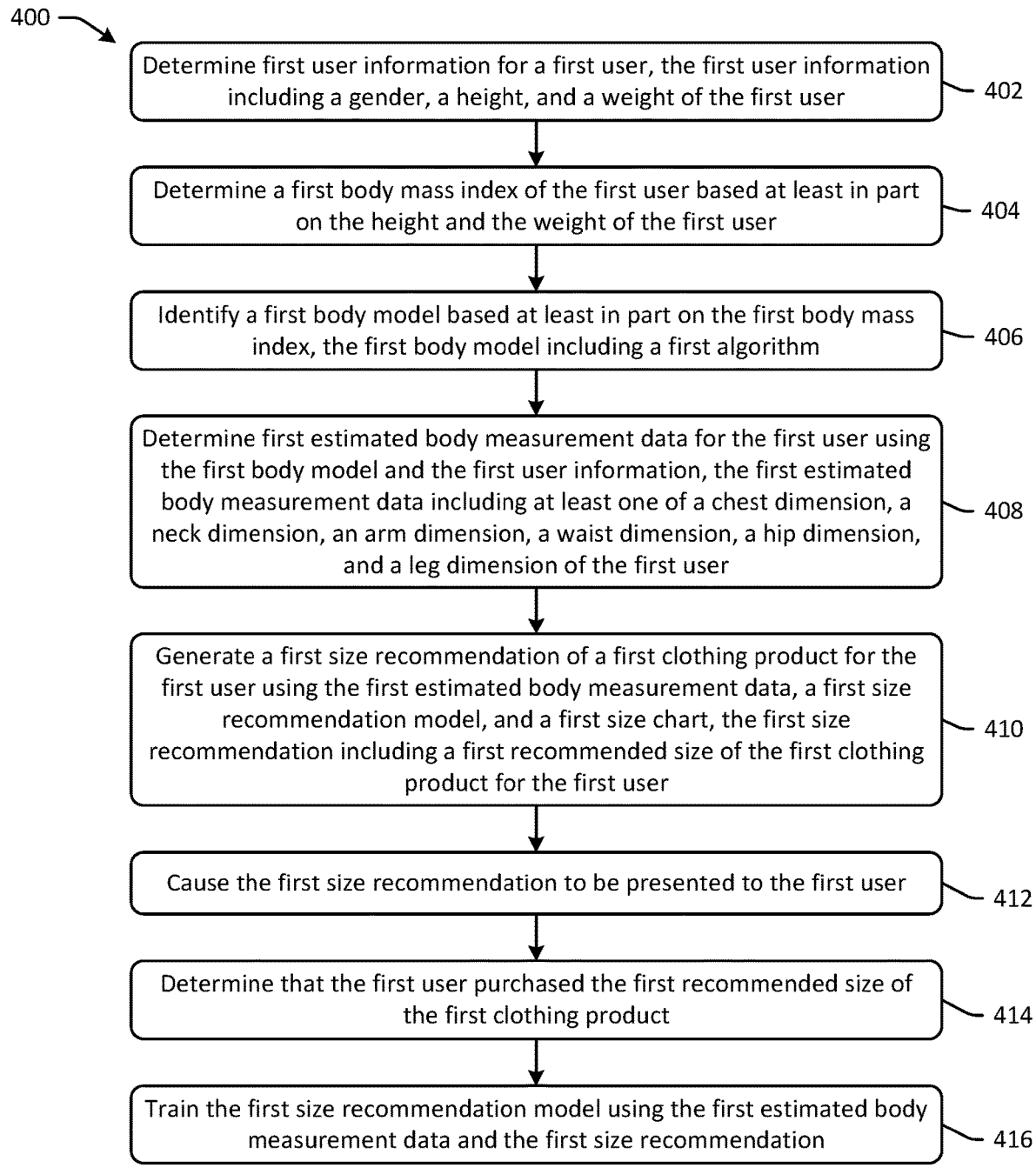
FIG. 4 is an example process flow diagram for determining recommended sizes of products using a machine learning model in accordance with one or more embodiments of the disclosure.

FIG. 4 depicts an example process flow 400 for determining recommended sizes of products using a machine learning model in accordance with one or more embodiments of the disclosure is depicted. Although certain operations are illustrated as occurring separately in FIG. 4, some or all of the operations may occur concurrently or partially concurrently across one or more computer systems. In some embodiments, the operations of the process flow 400 may be executed by a remote server, such as a product size recommendation server.

At block 402 of the process flow 400, first user information for a first user may be determined, the first user information including a gender, a height, and a weight of the first user. For example, computer-executable instructions of one or more product size recommendation module(s) stored at a server may be executed to determine first user information for a first user. In some embodiments, a server, such as a product size recommendation server, may determine first user information for a first user.

At block 404 of the process flow 400, a first body mass index of the first user may be determined based at least in part on the height and the weight of the first user. For example, computer-executable instructions of one or more product size recommendation module(s) stored at a server may be executed to determine a first body mass index of the first user based at least in part on the height and the weight of the first user. In some embodiments, a server, such as a product size recommendation server, may determine a first body mass index of the first user based at least in part on the height and the weight of the first user.

At block 406 of the process flow 400, a first body model may be determined based at least in part on the first body mass index, the first body model including a first algorithm. For example, computer-executable instructions of one or more product size recommendation module(s) stored at a server may be executed to determine a first body model based at least in part on the first body mass index, the first body model comprising a first algorithm. In some embodiments, a server, such as a product size recommendation server, may determine a first body model based at least in part on the first body mass index, the first body model comprising a first algorithm.

At block 408 of the process flow 400, first estimated body measurement data for the first user may be determined using the first body model, the first estimated body measurement data including at least one of a chest dimension, a neck dimension, an arm dimension, a waist dimension, a hip dimension, and a leg dimension of the first user. For example, computer-executable instructions of one or more product size recommendation module(s) stored at a server may be executed to determine first estimated body measurement data for the first user using the first body model. In some embodiments, a server, such as a product size recommendation server, may determine first estimated body measurement data for the first user using the first body model.

At block 410 of the process flow 400, a first size recommendation of a first clothing product for the first user may be determined using the first estimated body measurement data, a first size recommendation model, and a first size chart, the first size recommendation including a first recommended size of the first clothing product for the first user. For example, computer-executable instructions of one or more product size recommendation module(s) stored at a server may be executed to determine a first size recommendation of a first clothing product for the first user using the first estimated body measurement data, a first size recommendation model, and a first size chart. In some embodiments, a server, such as a product size recommendation server, may determine a first size recommendation of a first clothing product for the first user using the first estimated body measurement data, a first size recommendation model, and a first size chart.

At block 412 of the process flow 400, the first size recommendation may be caused to be presented to the first user. For example, computer-executable instructions of one or more product size recommendation module(s) stored at a server may be executed to cause the first size recommendation to be presented to the first user. In some embodiments, a server, such as a product size recommendation server, may cause the first size recommendation to be presented to the first user.

At block 414 of the process flow 400, it may be determined that the first user purchased the first recommended size of the first clothing product. For example, computer-executable instructions of one or more product size recommendation module(s) stored at a server may be executed to determine that the first user purchased the first recommended size of the first clothing product. In some embodiments, a server, such as a product size recommendation server, may determine that the first user purchased the first recommended size of the first clothing product.

At block 416 of the process flow 400, the first size recommendation model may be trained using the first estimated body measurement data and the first size recommendation. For example, computer-executable instructions of one or more product size recommendation module(s) stored at a server may be executed to train the first size recommendation model using the first estimated body measurement data and the first size recommendation. In some embodiments, a server, such as a product size recommendation server, may train the first size recommendation model using the first estimated body measurement data and the first size recommendation.

One or more operations of the method, process flows, or use cases of FIGS. 1-4 may have been described above as being performed by a user device, or more specifically, by one or more program module(s), applications, or the like executing on a device. It should be appreciated, however, that any of the operations of methods, process flows, or use cases of FIGS. 1-4 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4 may be described in the context of the illustrative devices, it should be appreciated that such operations may be implemented in connection with numerous other device configurations.

The operations described and depicted in the illustrative methods, process flows, and use cases of FIGS. 1-4 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 5:
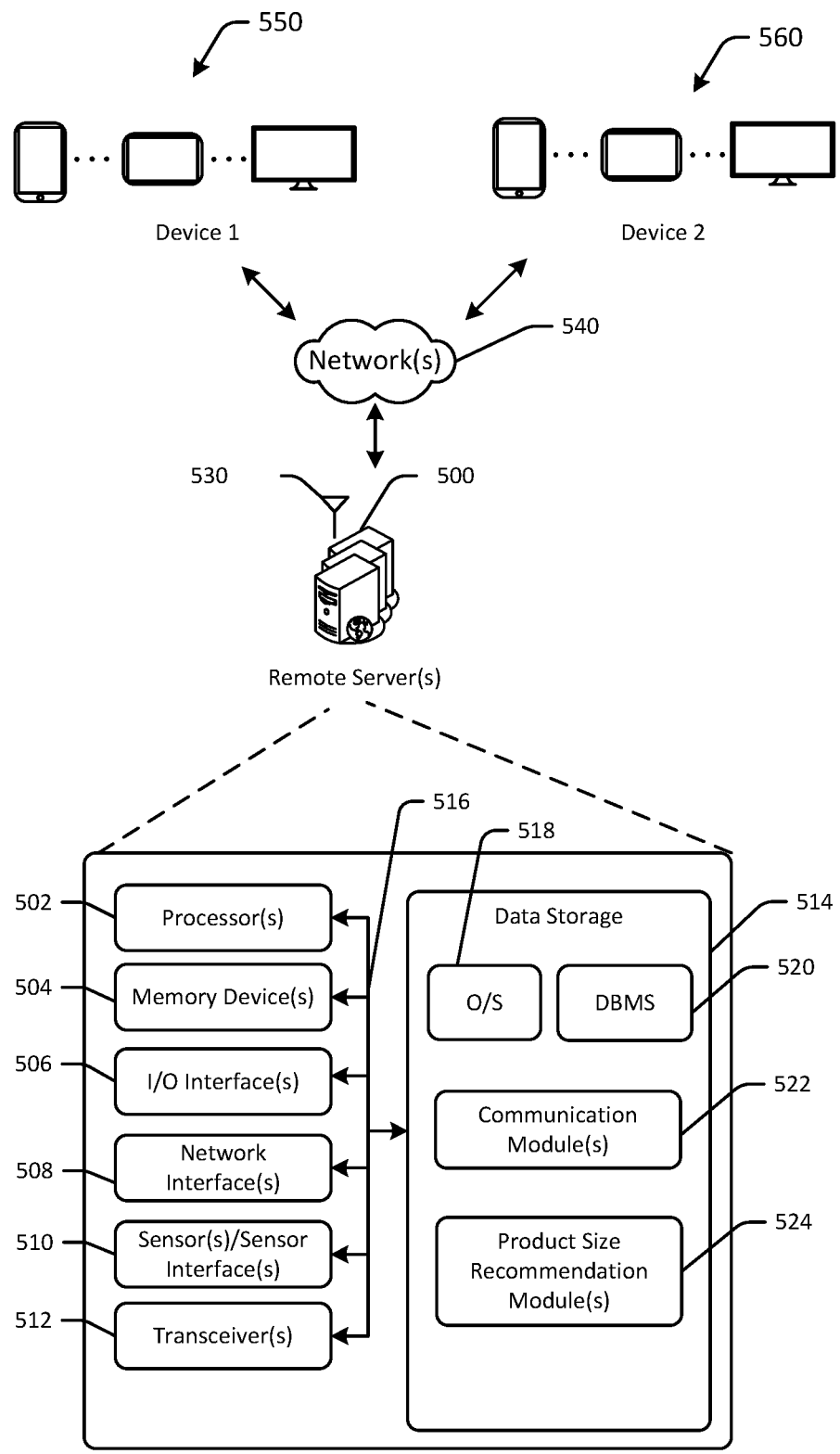
FIG. 5 schematically illustrates an example architecture of a system in accordance with one or more embodiments of the disclosure.

FIG. 5 is a schematic block diagram of one or more illustrative remote server(s) 500 in accordance with one or more example embodiments of the disclosure. The remote server(s) 500 may include any suitable computing device including, but not limited to, a server system, a mobile device such as a smartphone, a tablet, an e-reader, a wearable device, or the like; a desktop computer; a laptop computer; a content streaming device; a set-top box; or the like. The remote server(s) 500 may correspond to an illustrative device configuration for the product size recommendation server(s) of FIGS. 1-5.

The remote server(s) 500 may be configured to communicate via one or more networks with one or more servers, user devices, or the like. The remote server(s) 500 may be configured to manage one or more aspects of a number of content campaigns, such as content delivery parameters, distribution of content for presentation at respective delivery slots at a webpage or in an application, and other operations. The remote server(s) 500 may be configured to deliver or cause delivery of instructions and/or one or more pieces of content and may further be configured to determine a recommended size of a product for a user via at least determining user information, determining a body model based at least in part on the user information, determine estimated body measurement data using the body model, and generate a size recommendation of the product for the user using the estimated body measurement data and a size recommendation model. In some embodiments, a single remote server or single group of remote servers may be configured to perform more than one type of content delivery functionality.

The remote server(s) 500 may be configured to communicate via one or more networks 540. Such network(s) 540 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 540 may have any suitable communication range associated therewith and may include, for example, global networks (e.g., the Internet), metropolitan area networks (MANs), wide area networks (WANs), local area networks (LANs), or personal area networks (PANs). In addition, such network(s) 540 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In FIG. 5, the remote server(s) 500 may communicate with one or more user devices via the network(s) 540. For example, the remote server(s) 500 may communicate with a first user device 550 via the network(s) 540 when the first user device 550 is connected to the network(s) 540. Likewise, the remote server(s) 500 may communicate with a second user device 560 via the network(s) 540 when the second user device 560 is connected to the network(s) 540. The remote server(s) 500 may communicate with any number of semi-connected devices.

In an illustrative configuration, the remote server(s) 500 may include one or more processors (processor(s)) 502, one or more memory devices 504 (also referred to herein as memory 504), one or more input/output ("I/O") interface(s) 506, one or more network interface(s) 508, one or more sensors or sensor interface(s) 510, one or more transceivers 512, and data storage 514. The remote server(s) 500 may further include one or more buses 516 that functionally couple various components of the remote server(s) 500. The remote server(s) 500 may further include one or more antenna(e) 530 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 516 may include at least one of a system bus, a memory bus, an address bus, or a message bus, and may permit the exchange of information (e.g., data (including computer-executable code), signaling, etc.) between various components of the remote server(s) 500. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the remote server(s) 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 514 may include removable storage and/or non-removable storage including, but not limited to, magnetic storage, optical disk storage, and/or tape storage. The data storage 514 may provide non-volatile storage of computer-executable instructions and other data. The memory 504 and the data storage 514, removable and/or non-removable, are examples of computer-readable storage media (CRSM) as that term is used herein.

The data storage 514 may store computer-executable code, instructions, or the like that may be loadable into the memory 504 and executable by the processor(s) 502 to cause the processor(s) 502 to perform or initiate various operations. The data storage 514 may additionally store data that may be copied to the memory 504 for use by the processor(s) 502 during the execution of the computer-executable instructions. Moreover, output data generated as a result of execution of the computer-executable instructions by the processor(s) 502 may be stored initially in the memory 504, and may ultimately be copied to data storage 514 for non-volatile storage.

More specifically, the data storage 514 may store one or more operating systems (O/S) 518; one or more database management systems (DBMS) 520; and one or more program module(s), applications, engines, computer-executable code, scripts, or the like such as, for example, one or more communication module(s) 522 and/or one or more product size recommendation module(s) 524. Some or all of these module(s) may be or include sub-module(s). Any of the components depicted as being stored in data storage 514 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 514 may support the functionality described in reference to the corresponding components named earlier in this disclosure.

The data storage 514 may further store various types of data utilized by the components of the remote server(s) 500. Any data stored in the data storage 514 may be loaded into the memory 504 for use by the processor(s) 502 in executing computer-executable code. In addition, any data depicted as being stored in the data storage 514 may potentially be stored in one or more datastore(s) and may be accessed via the DBMS 520 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, an example datastore(s) may include, for example, product information for one or more products, user information for one or more users, one or more body models for determining estimated body measurement data, one or more size charts for determining size names and dimension ranges, one or more mapping tables for normalizing size names, historical data relating to user purchases and size recommendations, and/or other information.

The processor(s) 502 may be configured to access the memory 504 and execute computer-executable instructions loaded therein. For example, the processor(s) 502 may be configured to execute computer-executable instructions of the various program module(s), applications, engines, or the like of the remote server(s) 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the communication module(s) 522 may include computer-executable instructions, code, or the like that responsive to execution by one or more of the processor(s) 502 may perform functions including, but not limited to, communicating with remote servers, communicating with remote datastores, communicating with user devices, sending or receiving information and instructions, and the like.

The product size recommendation module(s) 524 may include computer-executable instructions, code, or the like that responsive to execution by one or more of the processor(s) 502 may perform functions including, but not limited to, determining first user information for a first user, identifying a first body model based at least in part on the first user information, determining first estimated body measurement data for the first user using the first body model, generating a first size recommendation of a first product for the first user using the first estimated body measurement data and a first size recommendation model, determining that the first user purchased the first recommended size of the first product, and updating the first size recommendation model using the first estimated body measurement data and the first size recommendation, and the like.

Referring now to other illustrative components depicted as being stored in the data storage 514, the O/S 518 may be loaded from the data storage 514 into the memory 504 and may provide an interface between other application software executing on the remote server(s) 500 and the hardware resources of the remote server(s) 500. More specifically, the O/S 518 may include a set of computer-executable instructions for managing the hardware resources of the remote server(s) 500 and for providing common services to other application programs (e.g., managing memory allocation among various application programs). In certain example embodiments, the O/S 518 may control execution of the other program module(s) to dynamically enhance characters for content rendering. The O/S 518 may include any operating system now known or which may be developed in the future including, but not limited to, any server operating system, any mainframe operating system, or any other proprietary or non-proprietary operating system.

The DBMS 520 may be loaded into the memory 504 and may support functionality for accessing, retrieving, storing, and/or manipulating data stored in the memory 504 and/or data stored in the data storage 514. The DBMS 520 may use any of a variety of database models (e.g., relational model, object model, etc.) and may support any of a variety of query languages. The DBMS 520 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 500 is a mobile device, the DBMS 520 may be any suitable light-weight DBMS optimized for performance on a mobile device.

Referring now to other illustrative components of the remote server(s) 500, the input/output (I/O) interface(s) 506 may facilitate the receipt of input information by the remote server(s) 500 from one or more I/O devices as well as the output of information from the remote server(s) 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 530 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, a WiMAX network, a 3G network, etc.

The remote server(s) 500 may further include one or more network interface(s) 508 via which the remote server(s) 500 may communicate with any of a variety of other systems, platforms, networks, devices, and so forth. The network interface(s) 508 may enable communication, for example, with one or more wireless routers, one or more host servers, one or more web servers, and the like via one or more networks.

The antenna(e) 530 may include any suitable type of antenna depending, for example, on the communications protocols used to transmit or receive signals via the antenna (e) 530. Non-limiting examples of suitable antennae may include directional antennae, non-directional antennae, dipole antennae, folded dipole antennae, patch antennae, multiple-input multiple-output (MIMO) antennae, or the like. The antenna(e) 530 may be communicatively coupled to one or more transceivers 512 or radio components to which or from which signals may be transmitted or received.

As previously described, the antenna(e) 530 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 530 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 530 may be configured to transmit or receive radio frequency signals within any suitable frequency range forming part of the unlicensed portion of the radio spectrum.

The antenna(e) 530 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 530—transmitting or receiving radio frequency (RF) signals in the bandwidth and/or channels corresponding to the communications protocols utilized by the remote server(s)

500 to communicate with other devices. The transceiver(s) 512 may include hardware, software, and/or firmware for modulating, transmitting, or receiving—potentially in cooperation with any of antenna(e) 530—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the remote server(s) 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 5 as being stored in the data storage 514 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server(s) 500, and/or hosted on other computing device(s) accessible via one or more networks, may be provided to support the functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the remote server(s) 500 may include alternate and/or additional hardware, software, or firmware components beyond those described or depicted without departing from the scope of the disclosure. More particularly, it should be appreciated that software, firmware, or hardware components depicted as forming part of the remote server(s) 500 are merely illustrative and that some components may not be present or additional components may be provided in various embodiments. While various illustrative program module(s) have been depicted and described as software module(s) stored in the data storage 514, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms which may be used interchangeably herein.

That which is claimed is:

1. A method comprising:
    determining, by one or more computer processors coupled to at least one memory, first user information for a first user, the first user information comprising a height and a weight of the first user;
    determining a first body model based at least in part on the first user information, the first body model comprising a first algorithm;
    determining first estimated body measurement data for the first user using the first body model, the first estimated body measurement data comprising one or more physical dimensions of the first user;
    generating a first size recommendation of a first product for the first user using the first estimated body measurement data and a first size recommendation model, the first size recommendation comprising a first recommended size of the first product for the first user;
    determining that the first user purchased the first recommended size of the first product;
    updating the first size recommendation model using the first estimated body measurement data and the first size recommendation;
    determining second user information for a second user, the second user information comprising a height and a weight of the second user;
    determining second estimated body measurement data for the second user using the first body model, the second estimated body measurement data comprising one or more physical dimensions of the second user; and
    determining a second recommended size of a second product for the second user using the second estimated body measurement data, a second size recommendation model, and a size chart.

2. The method of claim 1, further comprising:
  determining a first body mass index of the first user based at least in part on the height and the weight of the first user;
  wherein determining the first body model based at least in part on the first user information comprises determining the first body model based at least in part on the first body mass index.

3. The method of claim 1, further comprising:
  determining second user information for a second user, the second user information comprising a height and a weight of the second user;
  determining second estimated body measurement data for the second user using the first body model, the second estimated body measurement data comprising one or more physical dimensions of the second user; and
  generating a second size recommendation of the first product for the second user using the second estimated body measurement data and the updated first size recommendation model, the second size recommendation comprising a second recommended size of the first product for the second user.

4. The method of claim 3, further comprising:
  determining that the second user purchased the second recommended size of the first product;
  determining that the second user did not return the second recommended size of the first product within a predetermined time period; and
  updating the first size recommendation model using the second estimated body measurement data and the second size recommendation.

5. The method of claim 1, further comprising:
  determining second user information for a second user, the second user information comprising a height and a weight of the second user;
  determining a second body model based at least in part on the second user information, the second body model comprising a second algorithm;
  determining second estimated body measurement data for the second user using the second body model, the second estimated body measurement data comprising one or more physical dimensions of the second user; and
  generating a second size recommendation of the first product for the second user using the second estimated body measurement data and a second size recommendation model, the second size recommendation comprising a second recommended size of the first product for the second user.

6. The method of claim 1, further comprising:
  determining that a first size name of the second recommended size in the size chart is not present in a size listing of a source marketplace;
  determining that the first size name of the second recommended size corresponds to a second size same in the size listing of the source marketplace; and
  generating a second size recommendation of the second product for the second user, the second size recommendation comprising the second size name of the second recommended size.

7. The method of claim 6, wherein determining that the first size name of the second recommended size corresponds to the second size same in the size listing of the source marketplace comprises determining that the first size name of the second recommended size corresponds to the second size same in the size listing of the source marketplace using a mapping table comprising the first size name and the second size name.

8. The method of claim 1, further comprising:
  determining that a first size name of the second recommended size in the size chart is not present in a size listing of a source marketplace;
  determining that the first size name of the second recommended size fails to correspond to a second size same in the size listing of the source marketplace;
  generating a second size recommendation of the second product for the second user, the second size recommendation comprising the first size name of the second recommended size; and
  causing the second size recommendation to be presented to the second user.

9. The method of claim 1, further comprising:
  determining second user information for a second user, the second user information comprising a height and a weight of the second user, wherein the height of the second user is equal to the height of the first user, and wherein the weight of the second user is equal to the weight of the first user;
  determining second estimated body measurement data for the second user using the first body model, the second estimated body measurement data comprising one or more physical dimensions of the second user, wherein the second estimated body measurement data are equal to the first estimated body measurement data;
  generating a second size recommendation of the first product for the second user using the second estimated body measurement data and the first size recommendation model, the second size recommendation comprising a second recommended size of the first product for the second user, wherein the second recommended size is different than the first recommended size; and
  causing the second size recommendation to be presented to the second user.

10. The method of claim 1, further comprising:
  determining second user information for a second user, the second user information comprising a height and a weight of the second user;
  determining second estimated body measurement data for the second user using the first body model, the second estimated body measurement data comprising one or more physical dimensions of the second user;
  determining that the second user has modified the second estimated body measurement data to provide modified body measurement data; and
  generating a second size recommendation of the first product for the second user using the modified body measurement data and a second size recommendation model, the second size recommendation comprising a second recommended size of the first product for the second user.

11. The method of claim 1, further comprising:
  determining second user information for a second user, the second user information comprising a height and a weight of the second user;
  determining that the second user has modified the second user information to provide modified user information, the modified user information comprising a modified height or a modified weight of the second user;
  identifying a second body model based at least in part on the modified user information, the second body model comprising a second algorithm;

determining second estimated body measurement data for the second user using the second body model, the second estimated body measurement data comprising one or more physical dimensions of the second user; and generating a second size recommendation of the first product for the second user using the second estimated body measurement data and a second size recommendation model, the second size recommendation comprising a second recommended size of the first product for the second user.

12. A device comprising:

at least one memory that stores computer-executable instructions; and at least one processor configured to access the at least one memory and execute the computer-executable instructions to:

determine first user information for a first user, the first user information comprising a height and a weight of the first user;

determine a first body model based at least in part on the first user information, the first body model comprising a first algorithm;

determine first estimated body measurement data for the first user using the first body model, the first estimated body measurement data comprising one or more physical dimensions of the first user;

determine a first recommended size of a first product for the first user using the first body measurement data and a first size recommendation model;

generate a first size recommendation of a first product for the first user using the first estimated body measurement data and a first size recommendation model, the first size recommendation comprising a first recommended size of the first product for the first user;

determine that the first user purchased the first recommended size of the first product;

update the first size recommendation model using the first estimated body measurement data and the first size recommendation;

determine second user information for a second user, the second user information comprising a height and a weight of the second user, wherein the height of the second user is equal to the height of the first user, and wherein the weight of the second user is equal to the weight of the first user;

determine second estimated body measurement data for the second user using the first body model, the second estimated body measurement data comprising one or more physical dimensions of the second user, wherein the second estimated body measurement data are equal to the first estimated body measurement data;

generate a second size recommendation of the first product for the second user using the second estimated body measurement data and the first size recommendation model, the second size recommendation comprising a second recommended size of the first product for the second user, wherein the second recommended size is different than the first recommended size; and cause the second size recommendation to be presented to the second user.

13. The device of claim 12, wherein the at least one processor is further configured to access the at least one memory and execute the computer-executable instructions to:

determine second user information for a second user, the second user information comprising a height and a weight of the second user;

determine second estimated body measurement data for the second user using the first body model, the second estimated body measurement data comprising one or more physical dimensions of the second user;

generate a second size recommendation of the first product for the second user using the second estimated body measurement data and the updated first size recommendation model, the second size recommendation comprising a second recommended size of the first product for the second user;

determine that the second user purchased the second recommended size of the first product;

determine that the second user did not return the second recommended size of the first product within a predetermined time period; and update the first size recommendation model using the second estimated body measurement data and the second size recommendation.

14. The device of claim 12, wherein the at least one processor is further configured to access the at least one memory and execute the computer-executable instructions to:

determine second user information for a second user, the second user information comprising a height and a weight of the second user;

determine second estimated body measurement data for the second user using the first body model, the second estimated body measurement data comprising one or more physical dimensions of the second user;

determine a second recommended size of a second product for the second user using the second estimated body measurement data, a second size recommendation model, and a size chart;

determine that a first size name of the second recommended size in the size chart is not present in a size listing of a source marketplace;

determine that the first size name of the second recommended size corresponds to a second size same in the size listing of the source marketplace; and generate a second size recommendation of the second product for the second user, the second size recommendation comprising the second size name of the second recommended size.

15. A method comprising:

determining, by one or more computer processors coupled to at least one memory, a height and a weight of a first user;

determining a first body model for the first user, the first body model comprising a first algorithm;

determining first estimated body measurement data for the first user using the first body model;

generating a first recommended size of a first product for the first user using the first estimated body measurement data and a first size recommendation model;

determining that the first user purchased the first recommended size of the first product;

updating the first size recommendation model using the first estimated body measurement data and the first size recommendation;

determining a height and a weight of a second user;
determining second estimated body measurement data for the second user using the first body model; and
generating a second recommended size of the first product for the second user using the second estimated body measurement data and the updated first size recommendation model.

16. The method of claim 15, further comprising:
determining that the second user purchased the second recommended size of the first product;
determining that the second user did not return the second recommended size of the first product within a predetermined time period; and
updating the first size recommendation model using the second estimated body measurement data and the second size recommendation.

17. The method of claim 15, further comprising:
determining a first body mass index of the first user based at least in part on the height and the weight of the first user;
wherein determining the first body model based at least in part on the first user information comprises determining the first body model based at least in part on the first body mass index.

18. The method of claim 15, further comprising:
determining that a first size name of the second recommended size is not present in a size listing of a source marketplace;
determining that the first size name of the second recommended size fails to correspond to a second size same in the size listing of the source marketplace;
generating a second recommended size for the second user; and
causing the second recommended size to be presented to the second user.

19. The method of claim 15, further comprising:
determining that the second user has modified the second estimated body measurement data to provide modified body measurement data; and
generating a second size recommendation of the first product for the second user using the modified body measurement data and a second size recommendation model, the second size recommendation comprising a second recommended size of the first product for the second user.

20. The method of claim 15, wherein the height of the second user is equal to the height of the first user, and wherein the weight of the second user is equal to the weight of the first user, the method further comprising:
generating a third recommended size of the first product for the second user using the second estimated body measurement data and the first size recommendation model, wherein the third recommended size is different than the second recommended size; and
causing the third size recommendation to be presented to the second user.

* * * * *